US010903684B2

(12) United States Patent
Krompaß et al.

(10) Patent No.: US 10,903,684 B2
(45) Date of Patent: Jan. 26, 2021

(54) METHOD FOR OPERATING A NETWORK HAVING MULTIPLE NODE DEVICES, AND NETWORK

(71) Applicant: Siemens Aktiengesellschaft, Munich (DE)

(72) Inventors: Denis Krompaß, Munich (DE); Ulrich Münz, Plainsboro, NJ (US); Sebnem Rusitschka, Munich (DE); Volker Tresp, Munich (DE)

(73) Assignee: SIEMENS AKTIENGESELLSCHAFT

( * ) Notice: Subject to any disclaimer, the term of this patent is extended or adjusted under 35 U.S.C. 154(b) by 420 days.

(21) Appl. No.: 15/740,274

(22) PCT Filed: May 25, 2016

(86) PCT No.: PCT/EP2016/061757
§ 371 (c)(1),
(2) Date: Dec. 27, 2017

(87) PCT Pub. No.: WO2017/001122
PCT Pub. Date: Jan. 5, 2017

(65) Prior Publication Data
US 2018/0191195 A1 Jul. 5, 2018

(30) Foreign Application Priority Data
Jun. 29, 2015 (DE) .................... 10 2015 212 026

(51) Int. Cl.
*G06Q 50/06* (2012.01)
*H02J 13/00* (2006.01)
(Continued)

(52) U.S. Cl.
CPC .......... *H02J 13/0006* (2013.01); *G06Q 10/06* (2013.01); *G06Q 50/06* (2013.01);
(Continued)

(58) Field of Classification Search
None
See application file for complete search history.

(56) References Cited

U.S. PATENT DOCUMENTS 6,377,987 B1 * 4/2002 Kracht ................ H04L 41/0213
370/254
6,728,245 B1 * 4/2004 Nakatsugawa ......... H04L 12/46
370/392

(Continued)

OTHER PUBLICATIONS

Selim Haysam et al; "Statistical Modeling and Scalable, Interactive Visualization of Large Scale Big Data Networks"; 2014 ASE Bigdata/Socialcom/Sybersecurity Conference, Stanford University: May 27-31, 2014; pp. 1-6; gefunden am Jul. 28, 2016 im Internet: URL:http://www.ase360.org/bitstream/handle/123456789/139/submission5.pdf?sequence=1&isAllowed=y; XP055291806; 2014.

(Continued)

*Primary Examiner* — Viet D Vu
(74) *Attorney, Agent, or Firm* — Schmeiser, Olsen & Watts LLP

(57) ABSTRACT

A method for operating a network, such as an automation network, for example, has multiple node devices provided that are networked to one another. There is a global time available, and the node devices record their operating parameters. The operating parameters are allocated to a respective address element as content elements in order to be stored in a tensorial database structure. Control or adaptation of the operation of the network with its node devices and couplings is facilitated thereby. The method is suitable particularly for use in supply networks, automated production installations, communication networks, transport networks and logistical networks. The proposed storing allows easy visualisation, depiction and evaluation of operating states of the network and of its node devices.

13 Claims, 7 Drawing Sheets

(51) Int. Cl.
*G06Q 10/06* (2012.01)
*H02J 3/00* (2006.01)

(52) U.S. Cl.
CPC ......... *H02J 13/00001* (2020.01); *H02J 3/003* (2020.01); *H02J 2203/20* (2020.01); *Y02E 60/00* (2013.01); *Y04S 10/40* (2013.01); *Y04S 10/50* (2013.01); *Y04S 40/20* (2013.01)

(56) References Cited

U.S. PATENT DOCUMENTS

| | | | |
|---|---|---|---|
| 8,051,156 | B1 | 11/2011 | Sharma et al. |
| 8,918,842 | B2 | 12/2014 | Taft |
| 2005/0030968 | A1* | 2/2005 | Rich ..................... H04W 74/06 |
| | | | 370/449 |
| 2008/0281801 | A1* | 11/2008 | Larson ................. G06F 16/284 |
| 2012/0246268 | A1* | 9/2012 | Richeson ............... G01D 4/004 |
| | | | 709/217 |
| 2014/0244065 | A1 | 8/2014 | Biswas et al. |
| 2017/0140033 | A1* | 5/2017 | Baum ..................... G06F 40/30 |
| 2018/0034715 | A1* | 2/2018 | Nagaraju ................ H04L 41/14 |

OTHER PUBLICATIONS

Paula S Castro Vide et al; "Use of available phasor measurements for system observability: A case study"; Power Engineering, Energy and Electrical Drives; 2009; Powereng '09; International Conference on IEEE, Piscataway, NJ, USA; pp. 95-100; ISBN: 978-1-4244-4611-7; XP031453967;; 2009.

PCT International Search Report for PCT International Application No. PCT/EP2016/061757, dated Aug. 5, 2016.

\* cited by examiner

METHOD FOR OPERATING A NETWORK HAVING MULTIPLE NODE DEVICES, AND NETWORK

CROSS-REFERENCE TO RELATED APPLICATIONS

This application claims priority to PCT Application No. PCT/EP2016/061757, having a filing date of May 25, 2016, based off of German application No. DE 102015212026.0 having a filing date of Jun. 29, 2015, the entire contents of both of which are hereby incorporated by reference.

FIELD OF TECHNOLOGY

The present invention relates to a method for operating a network having multiple node devices and to a network that is suitable for carrying out this method.

BACKGROUND

For automation and (industrial) process sequences, complex and detailed automation data are captured by measurement points, which can correspond to nodes of a network, of an intelligent and digitized infrastructure. Such infrastructures comprising networked measurement points include high-voltage networks, transport networks, supply chains, logistics and manufacturing installations. The automation data are interlinked graphical data about the dynamic currents or flows in these dynamic networks, which graphical data are captured continually, in real time and spatiotemporally, in particular. The automation data of a measurement point can comprise multiple measured variables in this case. Multidimensional automation data, in particular, are obtained if multiple measured variables are recorded per measurement point.

US 2014/0244065 A1 uses the example of an electrical supply network to show how information about the structure of the network and measured values, such as the voltage at a node or the load on a connecting line, for example, can be used to monitor the state of the network.

Conventionally, the automation data are stored in relational databases, for example. In this case, it is desirable to be able to quickly access the stored automation data and at the same time to make optimal use of an available storage capacity. For analysis and evaluation, different database systems are sometimes used in parallel, which means that their volume of automation data is increased as a whole. Automated evaluation of the automation data is also hampered if different database systems are used.

To date, automated evaluation of the automation data has been realized by means of effective data mining and adaptive systems. It is desirable to operate the automation system on the basis of self-acquired automation data and automated evaluation thereof. For the evaluation of the automation data, particularly for the data mining, special data formats are used.

To reduce the complexity of the automation data, a linear reduction can be made. However, this technique is rather unsuitable for handling complex, nonlinear automation data. Nonlinear data models are further deemed not yet mature.

BACKGROUND

Against this background, multidimensional data modeling, particularly what is known as "Online Analytical Processing" (OLAP), has gained significance over recent decades. The core of any OLAP system is formed by what is known as an "OLAP cube", which includes numeral entries (measures) that are classified according to measured variables. The entries are each allocated to the interfaces of a "hypercube" that is covered by the measured variables as dimensions as a vector space. In OLAP systems too, a compromise must be made between the efficiency in data security and efficiency for data requests.

The measures engaged to date for evaluating and capturing automation data of an automation network for operation thereof are in some cases considered to be inadequate.

Against this background, it is an object of the present invention to improve the operation of a network, particularly an automation network.

Accordingly, a method for operating a network having multiple node devices is proposed. The method comprises the steps of:

coupling each node device to at least one other node device by means of a respective edge device;

stipulating a global time for all the node devices and edge devices;

recording the node devices;

recording the edge devices;

allocating an address element to each node pair comprising two node devices that are intercouplable by means of an edge device;

storing the address elements;

allocating a content element to each address element, the content element indicating the presence or absence of an edge device between the node pair to which the address element is allocated;

storing the content element on the basis of the respective address element to which the content element has been allocated;

recording at least one operating parameter for at least one selected node pair or a selected node device; and storing the at least one operating parameter as a further content element on the basis of the respective address element that has been allocated to the selected node pair or the selected node device.

The recording of the edge devices and the recording of the at least one operating parameter involve a respective global time instant also being recorded. The respective global time instant is also stored when the content element and/or the further content element is/are stored, wherein the address element, the content element and the at least one further content element are stored in a database device having a tensorial data structure.

The proposed method is particularly suitable for operating a network that covers an area of up to $10^8$ km$^2$. Even the operation of a network of astronomical devices, e.g. satellites, is possible according to the method.

The network is an electrical supply system, a transport network, a supply network (e.g. water, gas, oil, food, goods, merchandise, etc.), a logistical chain and/or a manufacturing installation, for example. The network comprises a plurality of node devices and is particularly suitable for transporting or transmitting energy, current, goods, merchandise, people, traffic, resources, data and/or material between, from and/or to the node devices.

The node devices may be elements, devices, stations, units or other parts of the respective network. It is also possible to refer to a measurement point as a node device. By way of example, the node devices comprise power stations, substations, transformers, power poles, distributors or other parts of an electrical supply system. In particular, the node devices of an electrical supply system comprise a phasor measurement unit (PMU). In a further example, the node devices may be traffic lights, barriers, bridges, railway stations, airports, harbors, checkpoints or other supervisory units in a transport network. In particular, the node devices of a transport network can capture floating car data. In a further example, the node devices are individual production modules of a production installation that are able to carry out one or more actions (e.g. welding, soldering, transporting, drilling, cutting, etc.) to manufacture a product.

Further, node devices can exist really and physically in the respective network or may have been added virtually, e.g. by the operator of the network. Virtual node devices may be advantageous e.g. in order to represent complex-networked real node devices in simpler fashion and, as a result, to be able to control them better. By way of example, a real edge device can be divided into two "virtual" edges devices, which can be monitored and controlled separately, by adding a virtual node device. Virtual node devices may have been added to the network temporarily, in particular.

Further, node devices may be static, i.e. fixed in terms of location, or mobile. Node devices can exist temporarily, i.e. for a prescribed period, or may be temporarily disconnectable, in particular.

In particular, the network comprises intelligent digitized and/or automated node devices and/or edge devices. By way of example, the node devices and/or edge devices comprise cyber physical systems, intelligent electronic devices (IED) both at a field level and at one of the production or business management levels. In particular, the node devices are operated by means of realtime operating systems.

The intercoupling of the node devices relates particularly to making a connection between the respective node devices, which allows transport or a transmission between these node devices. By way of example, after successful coupling of two node devices of an electrical supply system, a flow of current between these node devices may be possible. Furthermore, a flow of goods, merchandise, people, traffic, data, information and/or material, for example, between two node devices of the respective network is made possible if these node devices are intercoupled.

In particular, the node devices can interchange information with one another, regardless of whether they are directly intercoupled. To this end, the network can have at least one control unit to which all the node devices and/or all the edge devices are coupled, so that an operator of the network can monitor and/or control the node devices and/or edge devices from the control unit.

The edge devices can each act as a respective connecting part between two intercoupled node devices. In particular, an edge device is installed, implemented or otherwise provided between two node devices in order to intercouple these two node devices.

Furthermore, both real and virtual sections (stretches) can intercouple or interconnect two node devices as the respective edge device. Examples of edge devices are power lines (high, medium or low voltage) of an electrical supply system and road or rail sections of a transport network. If the method relates to an air transport network with airports as node devices, for example, then all the air routes are edge devices. In a logistical network, the edge devices can comprise real transport link sections or virtual, arbitrary connection options between intercoupled stations (node devices).

It is possible for multiple connection options to exist between two node devices. In particular, the connection options can correspond to different directions (of the flow of material, merchandise, goods, current, information, traffic and/or resources) between two node devices. In this case, multiple edge devices may be defined, each of these edge devices corresponding to a respective one of these connection options, or all the connection options being combined as a single edge device, or virtual node devices being added to each of the connection options in order to be able to control the connection options individually.

The global time can relate to a standard measure of time in the respective network, i.e. all events, changes and/or innovations are recorded on the basis of the global time that is standard for all the node devices and edge devices of the network. Preferably, the global time for the network is linked to a precise and absolute reference time, e.g. an atomic clock or a satellite time.

Stipulating the global time allows the node devices and/or the edge devices to be synchronized. Events can accordingly be recorded in a standard measure of time and put into chronological order. This allows a search for the origin of an event to be facilitated. Depending on a data capture rate (e.g. multiple samples per second), synchronization of the node and edge devices by means of the global time can lead to improved temporal resolution of the recorded events in the network.

By way of example, all the node devices and all the edge devices are recorded and registered in a database device in the network. A database device is particularly a device for electronically managing data. The database device may be in central, local and/or distributed form. Preferably, any node device is couplable to any other node device of the network. Preferably, all the possible combinations of two node devices of the network (or of a portion of the network) are defined as node pairs. Alternatively, only those pairs of two node devices that are intercoupled can be recorded as node pairs.

By way of example, each of the node devices is provided with a respective index. Accordingly, the address element can include the two indices of the node devices of the respective node pair. As a result, there may be an explicit allocation of each node pair to an address element. All the address elements are stored centrally in a database device of the network and/or locally on the individual node devices. If the two node devices of a node pair are intercoupled by means of an edge device, the address element that is allocated to the node pair corresponds to the edge device. Accordingly, the address element may be stored locally on the edge device if the edge device has appropriate computation and/or storage capacity. The address element is particularly an assignment to a memory location. In one embodiment, the address element is a tuple comprising two numbers or indices. The indices may be integers.

Since the address elements each indicate a node pair having a first and a second node device, the sum total of all the address elements can cover a quadratic two-dimensional matrix, wherein a first dimension (e.g. rows) of the matrix corresponds to the first node devices and a second dimension (e.g. columns) of the matrix corresponds to the second node devices.

Each address element is allocated at least one content element. Subsequently, an associated address element for a content element denotes that address element to which the content element is allocated. The content element may be part of a data structure, such as e.g. a variable, a field, a table or an array. Preferably, a content element contains a timestamp.

The first content element indicates whether or not the node pair to which the address element is allocated is intercoupled by means of an edge device. By way of example, there is an entry for the first content element only if the node pair to which the address element is allocated is intercoupled by means of an edge device.

Further, one or more operating parameters are recorded for one or more selected node pairs. Preferably, node pairs that are intercoupled using an edge device are selected. Accordingly, the one or more operating parameters are recorded for the respective edge device.

Further, operating parameters can be recorded at two node devices, combined with one another and allocated to a coupling between the two node devices, regardless of whether or not an edge device exists between the two node devices. In this case, the coupling can relate to a function of the edge device. Combining can relate particularly to computing a content element by means of mathematical operations.

Moreover, multiple node devices that are at least partially intercoupled can form a subnetwork of the network. The operating parameters recorded at the multiple node devices are combined with one another and allocated to the subnetwork. The subnetwork can be considered to be a node device. Accordingly, operating parameters and content elements can be allocated to couplings between the subnetwork and further node devices.

Optionally, the one or more operating parameters can be recorded for one or more selected node devices. By way of example, the operating parameters recorded at a first node device can be compared with the operating parameters recorded at a second node device, which is coupled to the first node device, in order to compute an operating parameter for a node pair comprising the first and the second node device. In this case, at least one mathematical operation, e.g. addition, subtraction, multiplication, division, factorization or a combination of these, can be carried out.

Multiple operating parameters can be arranged in a field (e.g. in a vector array, in a table, in a list or in a matrix) and allocated to the respective address element. The order of the stored operating parameters is preferably standard for all the address elements of the network. Preferably, the first content element indicates whether the respective node pair is intercoupled by means of an edge device.

The at least one recorded operating parameter is allocated as at least one content element to the respective address element and hence to a node pair instead of to the node devices that form the node pair. This reduces a dimension or a degree of freedom for the storage and allocation of the content element.

The at least one operating parameter comprises, by way of example, a frequency, a voltage, a phase angle, an amplitude, a modulation, a power draw, a resistance, an operating temperature, a load, a runtime, a loading, a fill quantity, a flow quantity, an availability, a throughput, etc. The operating parameters are particularly suitable for characterizing or describing an operating state of the respective edge device, the respective node device and/or the node pair.

The at least one operating parameter can comprise data of an automation system. Further, the at least one operating parameter can comprise continual dynamic data. The at least one operating parameter may be interlinked. The at least one operating parameter and/or the content elements are, in particular, relational data, i.e. captured or created on the basis of internal and/or external factors, e.g. a topology of the network. In this case, the topology can relate to intercoupling of the node devices and the edge devices of the network.

The recording of the at least one operating parameter relates particularly to measuring, retrieving stored data, a local query to the respective node or edge device and/or periodic scanning of retrievable data.

The recording of the at least one operating parameter involves a respective instant in the global time of the network being recorded as well. In particular, the operating parameter is provided with a global time timestamp that indicates the instant at which the operating parameter has been recorded in the global time of the network. As a result, the recorded and stored operating parameters can be put into, e.g. chronological order.

The address element, the content element and the at least one further content element are stored in a database device as a tensorial data structure that is stored particularly as an object in a correspondingly structured database.

Subsequently, the stored tensorial data structure is also referred to as a tensorial database structure. The tensorial database structure relates to a multidimensional database structure having at least three dimensions or degrees of freedom that are linearly independent of one another. The proposed method involves the at least one operating parameter being recorded on the basis of a global time and a coupling of the respective node pair. The type of the recorded operating parameter results in three dimensions or degrees of freedom. The allocation and the storage of the recorded operating parameter as a content element are thus effected on the basis of the presence of a coupling of the respective node pair, the global time instant and the type of operating parameter.

According to a further embodiment, at least one portion of the node devices or edge devices provides the at least one operating parameter and the associated global time instant according to the tensorial database structure.

One or more node devices and/or edge devices can process the recorded operating parameter, and/or assign it to the respective address element, such that it is compliant with the tensorial database structure.

The global time instant of the recorded operating parameter, preferably in the form of a global time timestamp, is locally linked to the respective operating parameter. Further, a series of the recorded operating parameter can be created by virtue of the operating parameter being periodically or repeatedly recorded and stored in a time interval. To this end, the edge device and/or the node device can have a memory unit.

To this end, the node device and/or edge device can have a computation unit that can assign the recorded operating parameter to the respective address element and, if need be, can modify said operating parameter. This allows a local computation power to be utilized.

According to a further embodiment, the method further comprises:

recording a set of different operating parameters; and storing the different operating parameters as further content elements on the basis of the respective address element to which the further content elements are allocated.

Multiple operating parameters are recorded as a set of different operating parameters. Preferably, the set of different operating parameters prescribes an order of the different operating parameters. This allows standard allocation of the operating parameters as further content elements to the respective address element in a multidimensional database structure to be effected.

In particular, the recorded operating parameters as the set of different operating parameters can be adapted to suit the tensorial database structure in this manner.

According to a further embodiment, the at least one operating parameter characterizes a flow of traffic, a flow of current, a flow of material, a flow of energy, a power draw and/or a supply path.

Characterizing relates, by way of example, to describing properties, quantizing factors and influences, denoting features or reproducing physical variables that are typical of the network. Accordingly, the at least one operating parameter can at least partially reproduce an operating state of the network.

According to a further embodiment, the recording of the global time instant is effected by means of satellites, particularly a GPS system.

Accordingly, the global time of the network may be satellite-based and/or based on a GPS system. The recorded operating parameters are provided with a timestamp according to a satellite-based global time and/or a GPS time.

According to a further embodiment, at least one portion of the node devices and/or edge devices records and/or stores the at least one operating parameter on the basis of the allocated address element.

Recording and/or storing the at least one operating parameter is accordingly effected locally with at least one node device and/or edge device. In particular, the recorded and/or stored operating parameter is locally allocated to the respective address element. As a result, this operating parameter can be made compatible with a multidimensional database structure, particularly a tensorial database structure.

In particular, the local recording, processing and/or storing of the operating parameters at the node devices is effected based on the principles of the resilient distributed dataset (RDD). The recorded operating parameters can be divided into subgroups of operating parameters, with a respective method of processing existing for each subgroup and/or a dependency on other subgroups being defined.

According to a further embodiment, the controlling is effected by the at least one portion of the node devices and/or edge devices themselves.

Automated node and/or edge devices, in particular, can evaluate the operating parameters themselves and react to them. As a result, a level of automation of the network can be further increased, since even less human intervention is required.

According to a further embodiment, the coupling of each node device to at least one other node device is effected on the basis of the stored content elements.

The operating parameters stored as content elements can provide information about an advantageous coupling of the node devices of the network. The network could be arranged and/or rearranged on the basis of the recorded operating parameters.

According to a further embodiment, the method further comprises:

determining a reference value for one of the at least one operating parameters;

computing a relative operating parameter on the basis of the recorded operating parameter and the associated reference value; and storing the relative operating parameter on the basis of the address element to which the recorded operating parameter is allocated.

The network can have a reference value for at least one operating parameter. The recording of the operating parameter and/or the allocation of the recorded operating parameter as a further content element to an address element can be effected on the basis of the reference value.

According to a second aspect, a network having multiple node devices is proposed that is suitable for carrying out the method described above.

According to a further embodiment, the network is suitable for transporting or transmitting resources, material, current, energy and/or traffic.

According to a further embodiment, the network further comprises a database device and a computation unit. The database device can store address elements and at least one operating parameter of node pairs comprising two node devices that are intercouplable by means of a respective edge device. The computation unit can allocate at least one content element to the respective address element and can retrieve the address element or the at least one content element.

Preferably, the database device can store the address element and also one or more content elements in a multidimensional, in particular tensorial, database structure.

According to a further embodiment, the network further comprises a user interface for displaying the stored address element and the at least one stored content element for an operator of the network.

This allows the operator of the network to react to events manually and/or to control the edge and node devices manually despite the automation of the network.

The respective unit, for example computation unit, database device, control unit, edge devices and node devices, may be implemented as hardware and/or also as software. In the case of a hardware implementation, the respective unit may be in the form of an apparatus or in the form of part of an apparatus, for example in the form of a computer or in the form of a microprocessor or in the form of a control computer of a vehicle. In the case of a software implementation, the respective unit may be in the form of a computer program product, in the form of a function, in the form of a routine, in the form of part of a program code or in the form of an executable object.

In addition, a computer program product is proposed that prompts the performance of the method as explained above on a program-controlled device.

A computer program product, such as e.g. a computer program means, can be provided or delivered as a storage medium, such as e.g. a memory card, USB stick, CD-ROM, DVD, or in the form of a downloadable file from a server in a network, for example. This can be effected in a wireless communication network, for example, by the transmission of an appropriate file with the computer program product or the computer program means.

The embodiments and features described for the proposed apparatus apply to the proposed method accordingly, and vice versa.

Further possible implementations of the invention also comprise not explicitly cited combinations of features or embodiments described above or below for the exemplary embodiments. In this case, a person skilled in the art will also add single aspects as improvements or additions to the respective basic form of the invention.

BRIEF DESCRIPTION

Some of the embodiments will be described in detail, with reference to the following figures, wherein like designations denote like members, wherein.

In the figures, elements that are the same or have the same function have been provided with the same reference symbols, unless indicated otherwise.

DETAILED DESCRIPTION

Figure 1:
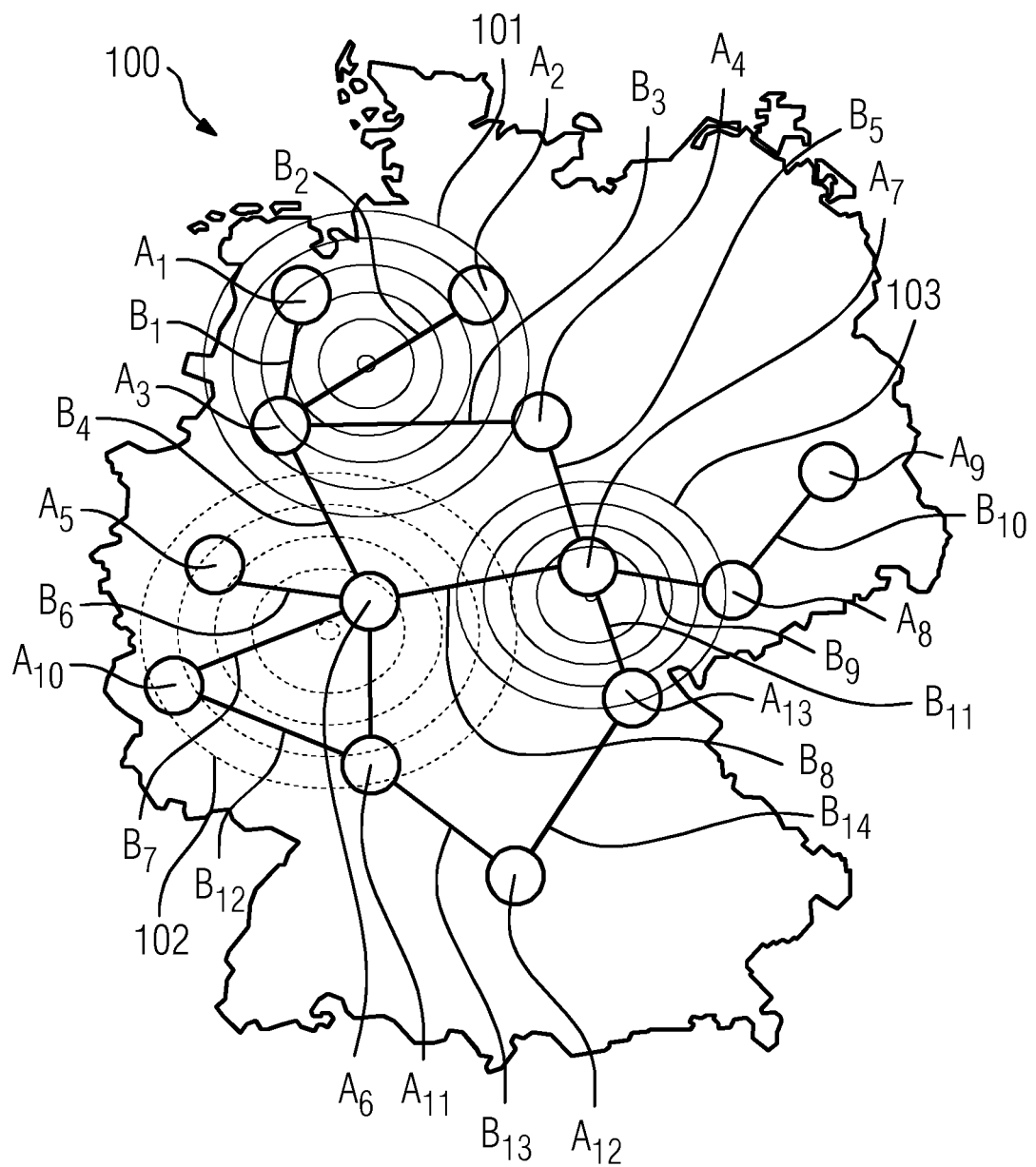
FIG. 1 shows a schematic view of an electrical supply system as an example of a network.

FIG. 1 shows a schematic view of an electrical supply system 100 as an example of a network.

The electrical supply system 100 comprises multiple node devices $A_1$-$A_{13}$ that are embodied as power stations, substations, load networks and/or transformers. Each of the node devices $A_1$-$A_{13}$ is coupled to at least one other node device $A_1$-$A_{13}$ by means of a respective power line $B_1$-$B_{14}$. The power lines $B_1$-$B_{14}$ correspond to edge devices of the electrical supply system 100. The node devices $A_1$-$A_{13}$ are at different distances from one another, a distance between two intercoupled node devices $A_1$-$A_{13}$ being able to be from a few km to several hundred km.

In a further exemplary embodiment, the network schematically depicted in FIG. 1 may be a transport network, the edge devices $B_1$-$B_{14}$ being road sections and the node devices $A_1$-$A_{13}$ being traffic control stations. The electrical supply system 100 is considered below.

The decision regarding whether two node devices $A_1$-$A_{13}$ are intercoupled is dependent on various internal and external factors. The internal factors are particularly operating parameters of the node or edge devices $A_1$-$A_{13}$, $B_1$-$B_{14}$. The external influences include, inter alia, a distance, a graphical position, a political situation, an infrastructure, a supplier/customer relationship and an economic situation. By way of example, the node devices $A_2$, $A_4$ are not intercoupled, although they are at a relatively short distance from one another in comparison with other node devices.

Depending on the type of the node devices $A_1$-$A_{13}$ intercoupled by means of a respective edge device $B_1$-$B_{14}$, an applied voltage on the edge device $B_1$-$B_{14}$ varies. By way of example, a high voltage of 220-380 kV may be applied to an edge device $B_1$-$B_{14}$ that connects a power station to a substation. A medium voltage of 1-50 kV may be applied to edge devices that connect a substation to a load network as node devices $A_1$-$A_{13}$. A low voltage of several 100 V may be applied to edge devices $B_1$-$B_{14}$ that connect single loads to one another or to a transformer as node devices $A_1$-$A_{13}$. The voltage is an example of an operating parameter with the node devices as measurement points.

A first group 101 of concentric circles denotes a first event E1, with a smallest circle of the group 101 indicating an epicenter and a largest circle of the group 101 indicating a maximum scope of action of the first event E1.

A second group 102 and a third group 103 of concentric circles denote a second and a third event E2, E3, respectively, with a respective smallest circle denoting the epicenter and a largest circle denoting a maximum scope of action of the respective event E2, E3. The events can comprise a disturbance, a natural event (e.g. a storm, an earthquake, etc.), an accident and/or another internal or external factor that influences the operation of the electrical supply system 100.

If one of the events E1-E3 occurs, it is thus possible for at least one of the operating parameters at the node devices $A_1$-$A_{13}$ and/or edge devices $B_1$-$B_{14}$ to differ from a value of an undisturbed state, i.e. to exhibit unusual fluctuations, to fall or to rise. In this case, the effect of the event E1-E3 on the operating parameters of the node devices $A_1$-$A_{13}$ and edge devices $B_1$-$B_14$ is greater the closer the respective node device $A_1$-$A_13$ or edge device $B_1$-$B_{14}$ is to the epicenter of the event E1-E3 taking place. If multiple events E1-E3 take place at the same time, as depicted in FIG. 1, the scope of actions of the events E1-E3 overlap. For example, the edge device $B_4$ is in the scope of action of both the first event E1 and the second event E2.

The electrical supply system 100 has a database device 110 (see FIG. 2) in which the recorded operating parameters are stored as content elements on the basis of intercouplings of the node devices $A_1$-$A_{13}$. An event E1-E3, for example a disturbance, can be recorded promptly and with a high level of position resolution on the basis of the content elements stored and retrievable in the database device 110. As a result, the operator of the electrical supply system 100 can react quickly and efficiently to the external influences.

Figure 2:
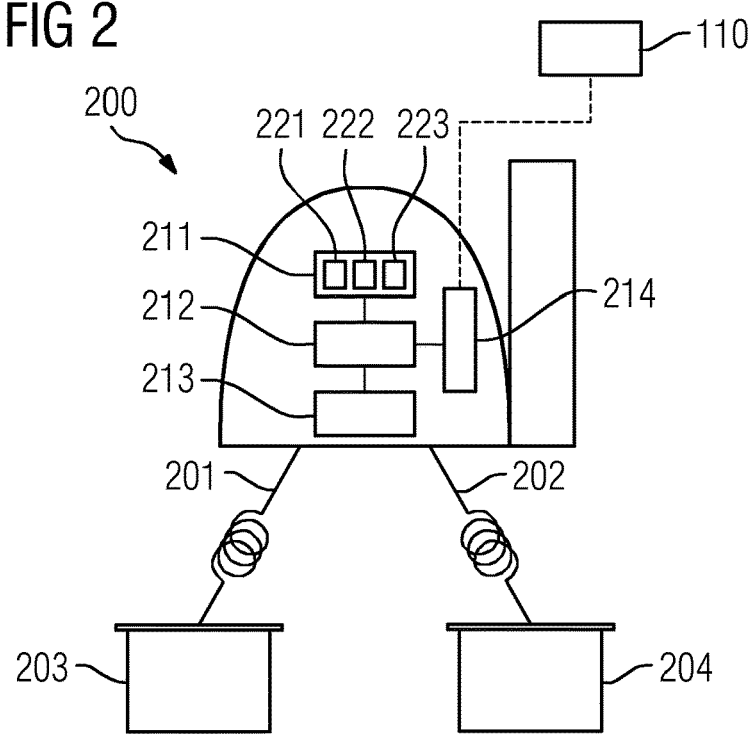
FIG. 2 shows a schematic view of a power station as an example of a node device of the electrical supply system in FIG. 1.

FIG. 2 shows a schematic view of a power station 200 as a node device or a measurement point of the electrical supply system 100 in FIG. 1.

The power station 200 is one of the node devices $A_1$-$A_{13}$ of the electrical supply system 100. The power station 200 is coupled to two substations 203, 204 as further node devices of the electrical supply system 100 by means of a respective power line 201, 202. The power station 200 supplies current and electrical power to the electrical supply system 100. The power station 200 communicates with a GPS system that particularly prescribes a global time for the electrical supply system 100.

The power station 200 has a control unit 211, a computation unit 212, a memory unit 213 and a communication unit 214. The control unit 211 comprises multiple sensor devices 221-223 that record a voltage, a frequency and a phase angle, respectively, on the power station 200. Further, the control unit 211 can record an operating temperature, a workload and an availability (e.g. "standby", "operating" or "servicing") as an operating state.

The control unit 211 records the measured voltage, the measured frequency, the measured phase angle and the measured operating state as a set of operating parameters and links the respective operating parameter to a timestamp that indicates when the respective operating parameter has been recorded in the global time measure of time. Further, the control unit 211 can have a user interface by means of which the operator of the power station 200 and/or of the electrical supply system 100 can retrieve and visually display the recorded and stored operating parameters.

The computation unit 212 receives the recorded operating parameters and the respective timestamp from the control unit 211. The computation unit 212 processes the operating parameters as content elements, as described in detail later. The content elements are stored in the memory unit 213 or optionally forwarded via the communication unit 214 to the central database device 110 of the electrical supply system 100.

Figure 3:
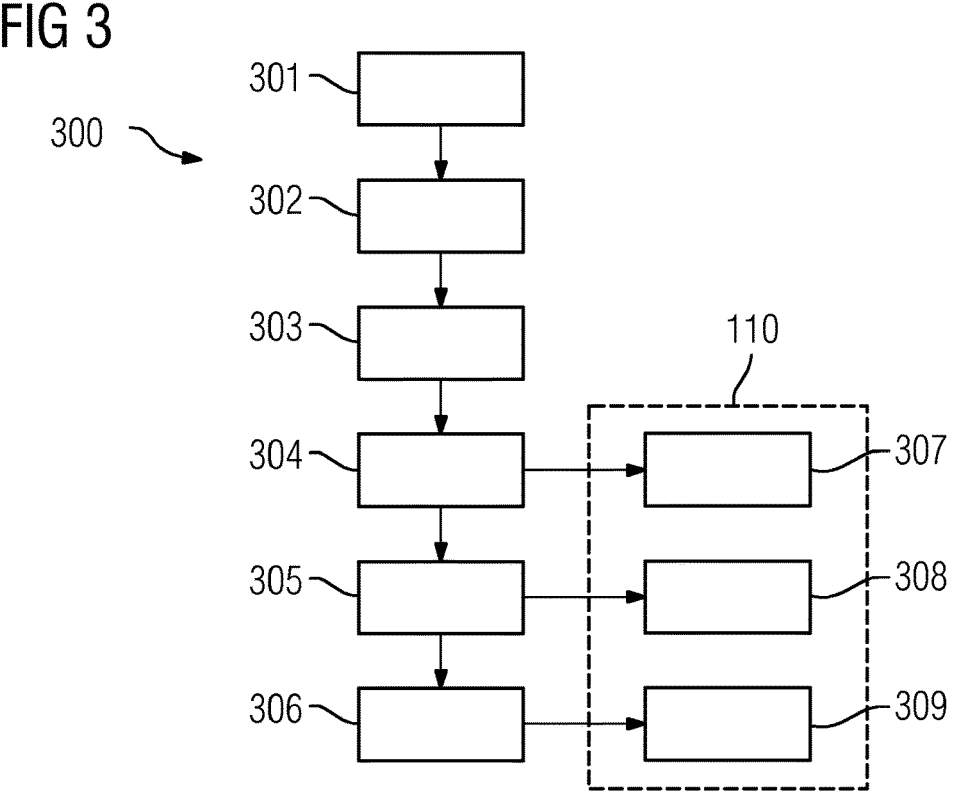
FIG. 3 shows a flowchart for a method for operating a network.

FIG. 3 shows a flowchart for a method 300 for operating a network, such as e.g. the electrical supply system 100 shown in FIGS. 1 and 2.

In a first step 301, each node device $A_1$-$A_{13}$ of the electrical supply system 100 is coupled to another node device $A_1$-$A_{13}$ of the electrical supply system 100 by means of a respective edge device $B_1$-$B_{14}$.

In a next step 302, a global time of the electrical supply system 100 is stipulated for all the node and edge devices $A_1$-$A_{13}$, $B_1$-$B_{14}$ of the electrical supply system 100. In particular, the global time is satellite-based or based on a GPS system.

In a next step 303, both the node devices $A_1$-$A_{13}$ and the edge devices $B_1$-$B_{14}$ of the electrical supply system 100 are recorded and registered.

In a next step 304, each node pair $n_p$-$n_q$, i.e. a combination of two node devices $n_p$ and $n_q$ of the electrical supply system 100, is allocated an address element $(n_p,n_q)$. The address element $(n_p,n_q)$ is provided with two indices p, q, each of the two indices p, q denoting a respective node device of the node pair. For example, the node pair $n_p$=$A_1$ and $n_q$=$A_{13}$, as shown in FIG. 1, is a combination of the node devices $A_1$ and $A_{13}$ to which the address element $(n_p,n_q)$ is allocated.

In a subsequent step 305, a content element is allocated to each address element $(n_p,n_q)$. The content element indicates whether or not there is a coupling between the node devices of the node pair. The value of the content element may be binary, for example. The content element can be depicted graphically on the basis of the node devices whose coupling is the content of the content element. This results in a two-dimensional table or a matrix that reproduces a topology of the network, particularly of the electrical supply system 100. The two-dimensional table is referred to as a topology level for example.

Figure 4:
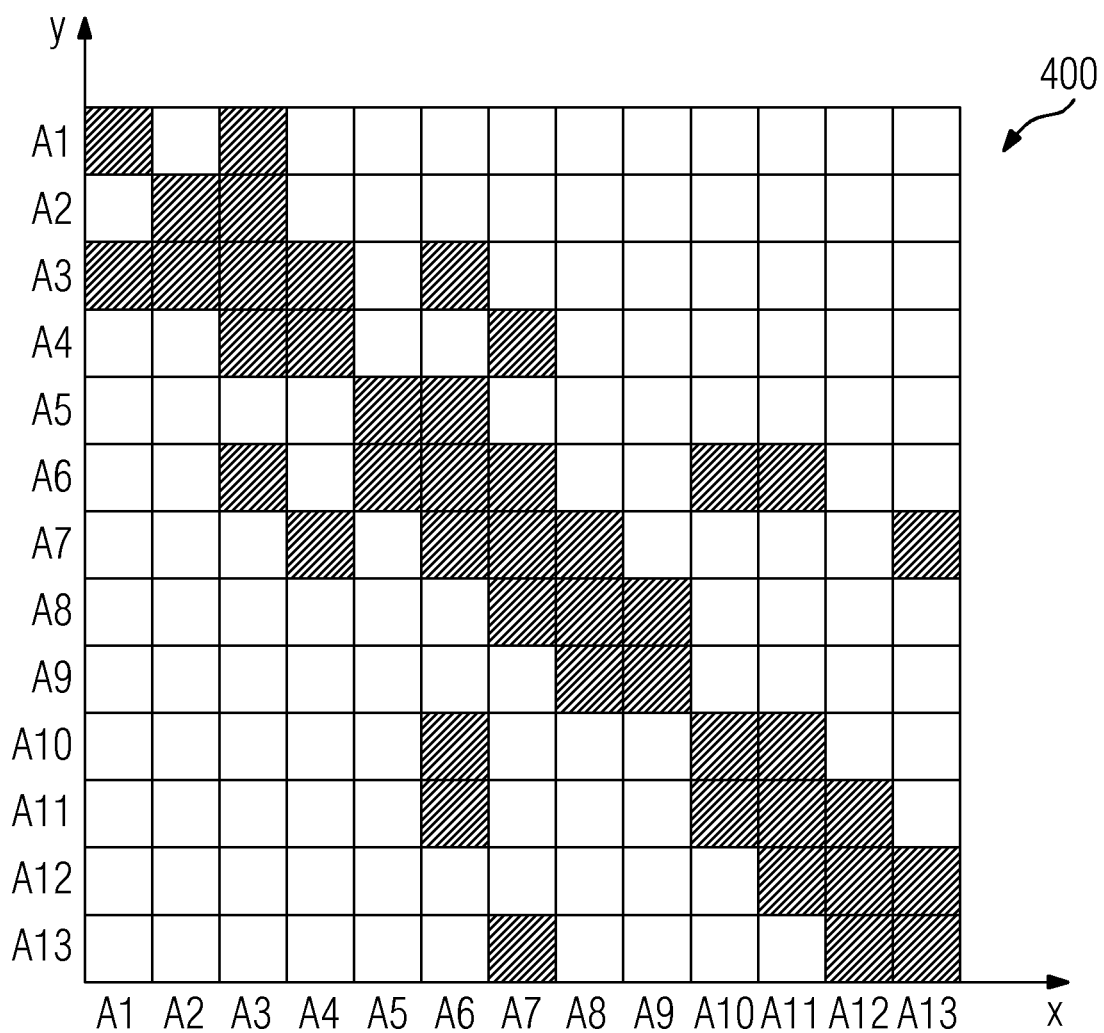
FIG. 4 shows a schematic view of a topology level.

FIG. 4 shows a schematic view of a topology level 400 that illustrates couplings of node devices $A_1$-$A_{13}$ of the electrical supply system 100 in FIG. 1.

The topology level 400 is indicated in the form of a two-dimensional table 400. Plotted in the x and y directions are the respective indices p, q, assigned to a respective node device $A_1$-$A_{13}$ of the electrical supply system 100, of the respective address element. The filled cells of the table 400 indicate that the applicable node devices $A_1$-$A_{13}$ of the electrical supply system 100 are intercoupled by means of a respective power line $B_1$-$B_{14}$ as an edge device.

The table 400 therefore illustrates a topology of the electrical supply system 100. The entries in the table 400 that correspond to the content elements may be binary and have e.g. a value of 0 or 1. By way of example, the content element of the cell $(A_7, A_{13})$ assumes the value 1 and shows that the node devices $A_7$, $A_{13}$ are intercoupled. There is thus an edge device between the node devices $A_7$, $A_{13}$. The entries in the table 400 may be more significant bit values (e.g. 8, 16, 32 or 64 bit values) in order to denote a type of coupling. The entries may further be unsymmetrical in respect of a diagonal of the table, particularly of the topology level, and may display a directional dependency of the couplings between the node devices $A_1$-$A_{13}$. In this case, the first index of the respective entry can indicate a starting node device, for example, while the second index of the content element indicates a destination node device.

In a further step 306, multiple operating parameters are recorded for at least one selected node pair np-nq or for a selected node device $A_1$-$A_{13}$. In particular, the operating parameters are measured at the edge devices $B_1$-$B_{14}$, i.e. between two coupled node devices $A_1$-$A_{13}$, by means of a respective sensor device, as shown in FIG. 2. By way of example, the sensor device 222 records a frequency of the supplied current as an operating parameter.

The allocated address element is written to a database device 110 in a step 307. The content element is stored in the database device 110 on the basis of the address element in a step 308. The operating parameters are stored as further content elements on the basis of the respective address element in a further step 309.

Figure 5:
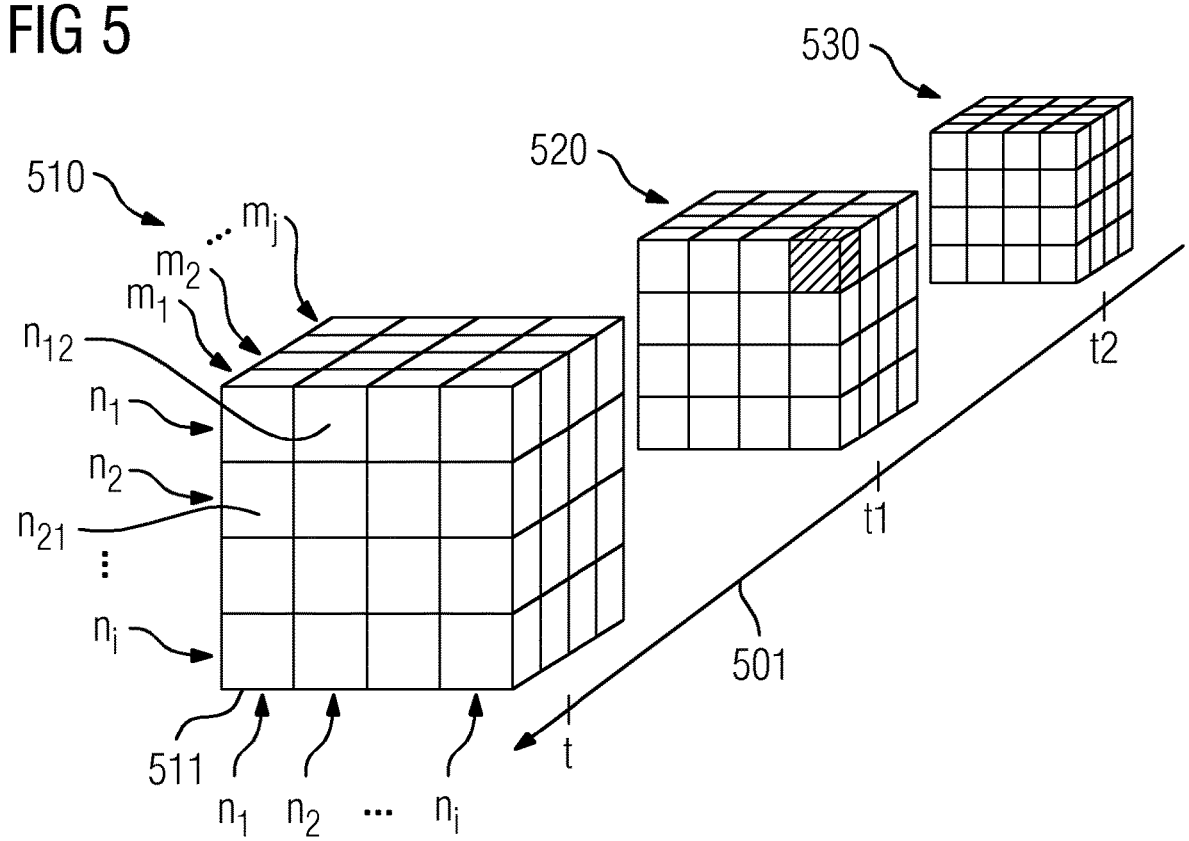
FIG. 5 shows a schematic view of a multidimensional database structure.

The stored address elements and content elements may be stored in a multidimensional database structure. FIG. 5 shows a schematic view of a multidimensional database structure 510-530 that is suitable.

The operating parameters recorded at the edge or node devices are stored in a database device of the respective network in a multidimensional database structure 510-530 as content elements. A set of node devices $n_1$-$n_i$ corresponds both to a first dimension and to a second dimension of the multidimensional database structure 510-530. A third dimension of the multidimensional database structure 510-530 is provided by various operating parameter types $m_1$-$m_j$. The operating parameter types $m_1$-$m_j$ comprise a voltage, a frequency, a phase angle and an operating state of the node devices $n_1$-ni of an electrical supply system, for example. A fourth dimension of the multidimensional database structure 510-530 is provided by the global time t, which is represented by an axis 501. A tensor and therefore a tensorial database structure is formed by at least three dimensions that are linearly independent of one another. The multidimensional database structure 510-530 is in the form of a tensorial database structure. Three tensors 510-530 depict the tensorial database structure at different instants t, $t_1$ and $t_2$ in this case. At each instant, there is a tensor 510-530 with the operating parameters.

The topology level 511, which indicates a topology of the network, forms a level in the multidimensional database structure 510-530. Preferably, the topology level 511 is a first level of the respective tensor 510-530, as shown in FIG. 5. The topology level 511 indicates whether and how the node devices $n_1$-$n_i$ are intercoupled. By way of example, the topology level 511 is constructed in accordance with the two-dimensional table 400, as indicated in FIG. 4.

The recorded operating parameters are assigned to one node pair each, i.e. to a pair comprising two node devices $n_1$-$n_i$ that are intercoupled or intercouplable. If two node devices $n_1$ and $n_2$ are intercoupled, an applicable entry (e.g. "1") is made in the cells $n_{12}$ and $n_{21}$ in the topology level 511. A first operating parameter type $m_1$ is a voltage, for example. The recorded voltage between the node devices $n_1$ and $n_2$ is entered into the cells $m_{1,12}$ and $m_{1,21}$ in the level $m_1$. Preferably, the cells $m_{1,12}$ and $n_{12}$ are arranged in accordance with the topology level 511 and are in parallel with the entries in the topology level 511 in respect of the third dimension $m_1$-$m_j$.

Further content elements of the operating parameter types $m_2$-$m_j$ are accordingly entered into the tensorial database structure. Overall, the operating parameters are entered into the tensorial database structure 510-530 depending on intercouplings of the node devices $n_1$-$n_i$. If there is no coupling existent between two node devices $n_1$-$n_i$, the operating parameters $m_1$-$m_j$ are not entered. Thus, it is not necessary to fill the cells of the tensorial database structure 510-530 completely. This allows better utilization of a storage capacity of the tensorial database structure. In this case, the global timestamp is assigned to the respective content element and stored as well.

Figure 6:
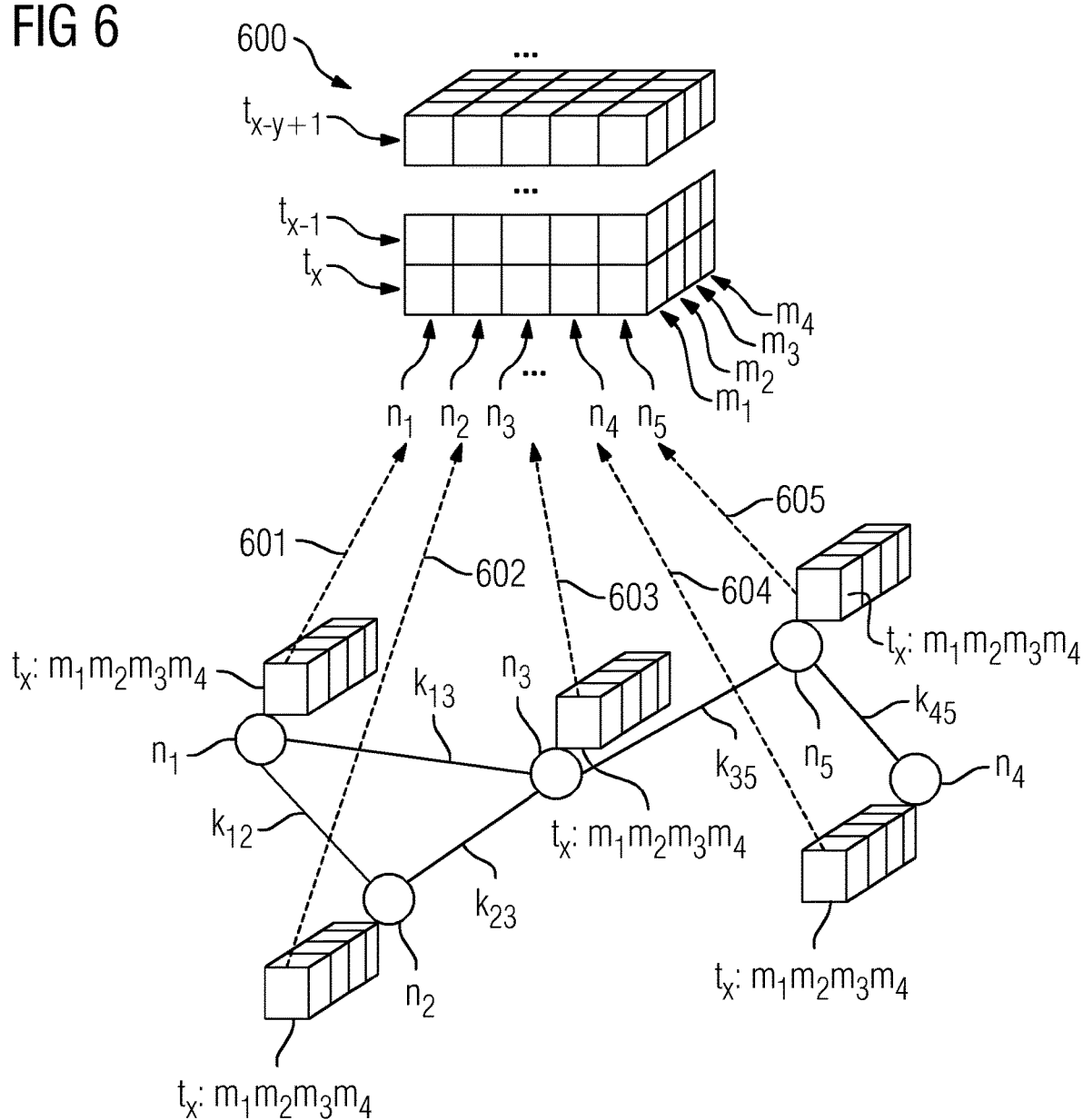
FIG. 6 shows a depiction to explain the recording and storage of content elements in a tensorial database structure.

FIG. 6 shows a depiction to explain a variant of the recording and storing of content elements in a tensorial database structure 600.

The arrows 601-605 respectively symbolize the storing of operating parameters that are recorded at a respective node device $n_1$-$n_5$ at the instant $t_x$ in the global time, as content elements in the database structure 600.

Each of the node devices $n_1$-$n_5$ is intercoupled to at least one other node device of the node devices $n_1$-$n_5$ by means of a respective edge device $k_{11}$-$k_{45}$. By way of example, the edge device $k_{12}$ intercouples the node devices $n_1$, $n_2$.

In FIG. 6, the second dimension—according to FIG. 5—of the tensorial database structure 600 is suppressed for a three-dimensional depiction. The node devices $n_1$-$n_5$ record a set of different operating parameters $m_1$-$m_4$ on the basis of time t. At the instant $t_x$, the operating parameters $m_1$-$m_4$ are processed by the respective node devices $n_1$-$n_5$ for entry into the tensorial database structure 601.

The operating parameters $m_1$-$m_4$ recorded at the node device $n_1$ at the instant $t_x$ are operating parameters that relate to the coupling between the node devices $n_2$ and $n_3$. The same applies to the operating parameters $m_1$-$m_4$ recorded at the node device $n_2$, which come from the coupling $n_1$-$n_3$ between the node devices $n_1$-$n_3$. The operating parameters $m_1$-$m_4$ recorded at the node device $n_3$ relate to the couplings $k_{13}$, $k_{23}$, $k_{35}$.

The operating parameters $m_1$-$m_4$ recorded at the node device $n_5$ relate to the couplings $k_{35}$, $k_{45}$. The node device $n_4$ is coupled solely to the node device $n_5$. The operating parameters $m_1$-$m_4$ recorded at the node device $n_4$ relate to the coupling $k_{45}$.

The operating parameters $m_1$-$m_4$ recorded at the node devices $n_1$-$n_5$ at the instant tx are processed either locally at the respective node devices $n_1$-$n_5$ or centrally to produce content elements for entry into the tensorial database structure 600. For this purpose, an analysis and abstraction of the recorded operating parameters are performed.

In particular, the operating parameters are preprocessed, preevaluated and preanalyzed locally by the respective node device $n_1$-$n_5$. As a result, a volume of data in the content elements for the tensorial database structure 600 can be reduced. In this case, it is further possible to use a local computation capacity of the node devices $n_1$-$n_5$.

In the tensorial database structure 600, the content elements are stored on the basis of intercouplings of the node devices $n_1$-$n_5$, on the basis of the operating parameter types and on the basis of time. The content elements of the tensorial database structure 601 can be updated continually, periodically and/or when a change in the operating parameters takes place.

The recorded operating parameters $m_1$-$m_4$ can be displayed locally on each of the node devices $n_1$-$n_5$ and centrally on a database device having the tensorial database structure 601.

Figure 7:
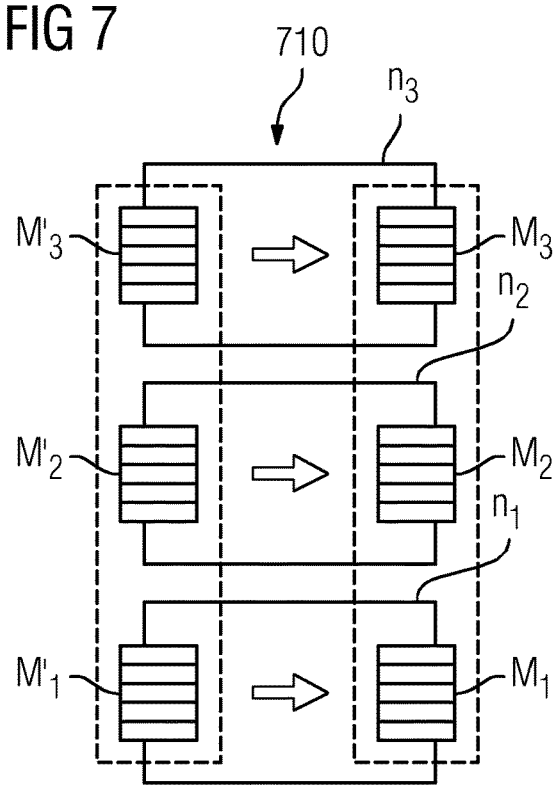
FIG. 7 illustrates a first embodiment of a method for processing operating parameters to produce content elements for a tensorial database structure.
Figure 8:
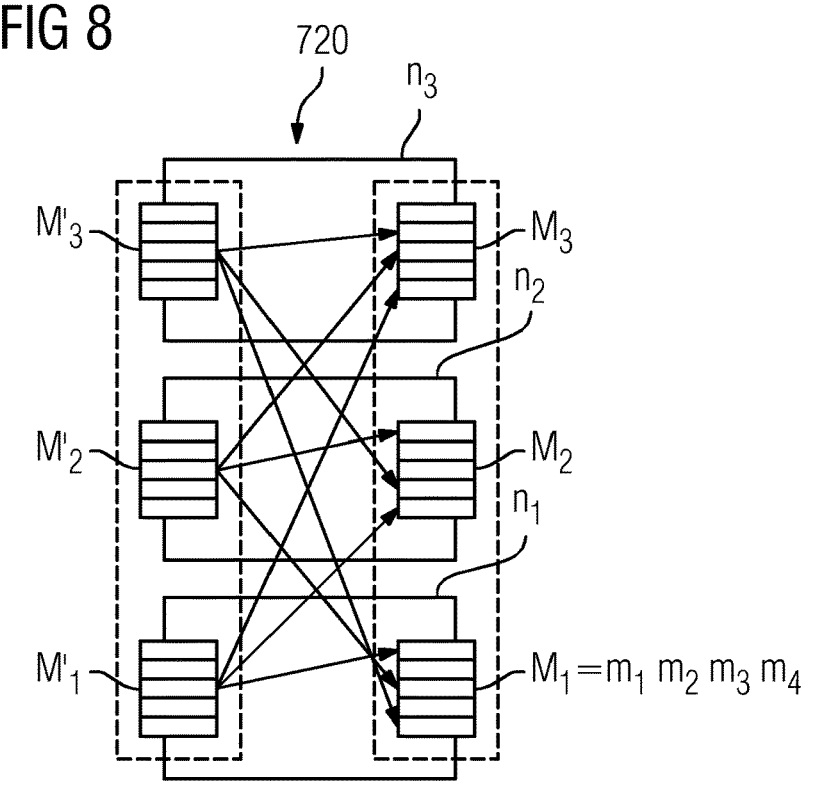
FIG. 8 illustrates a second embodiment of a method for processing operating parameters to produce content elements for a tensorial database structure.

FIG. 7 and FIG. 8 respectively explain the preprocessing of data at the node devices. To this end, FIG. 7 illustrates a first embodiment 710 and FIG. 8 illustrates a second embodiment 720 of a method for processing operating parameters to produce content elements for a tensorial database structure.

FIG. 7 shows the node devices $n_1$-$n_3$, which respectively record a set of operating parameters $M'_1$-$M'_3$. The operating parameters recorded at the node devices $n_1$-$n_3$ are independent of one another and possibly not suitable for storing in the tensorial database structure. Thus, as indicated by the respective arrow, preprocessing of the recorded operating parameters to produce content elements $m_1$-$m_4$ in the tensorial database structure is effected. In this case, $M_i$=$m_1$-$m_4$.

In FIG. 8, the recorded operating parameters $M'_1$, $M'_3$ are preprocessed to produce content elements $m_1$-$m_4$ of the tensorial database structure, the content elements $m_1$-$m_4$ being stored in a manner locally distributed at intercoupled node devices $n_1$-$n_3$. It is possible to refer to a distributed memory.

In embodiments, known RDD (resilient distributed datasets) methods are used for distributing and efficiently storing operating parameters. It is also conceivable for partial tensors, as depicted in FIG. 5, to be stored in distributed fashion in the network.

Figure 9:
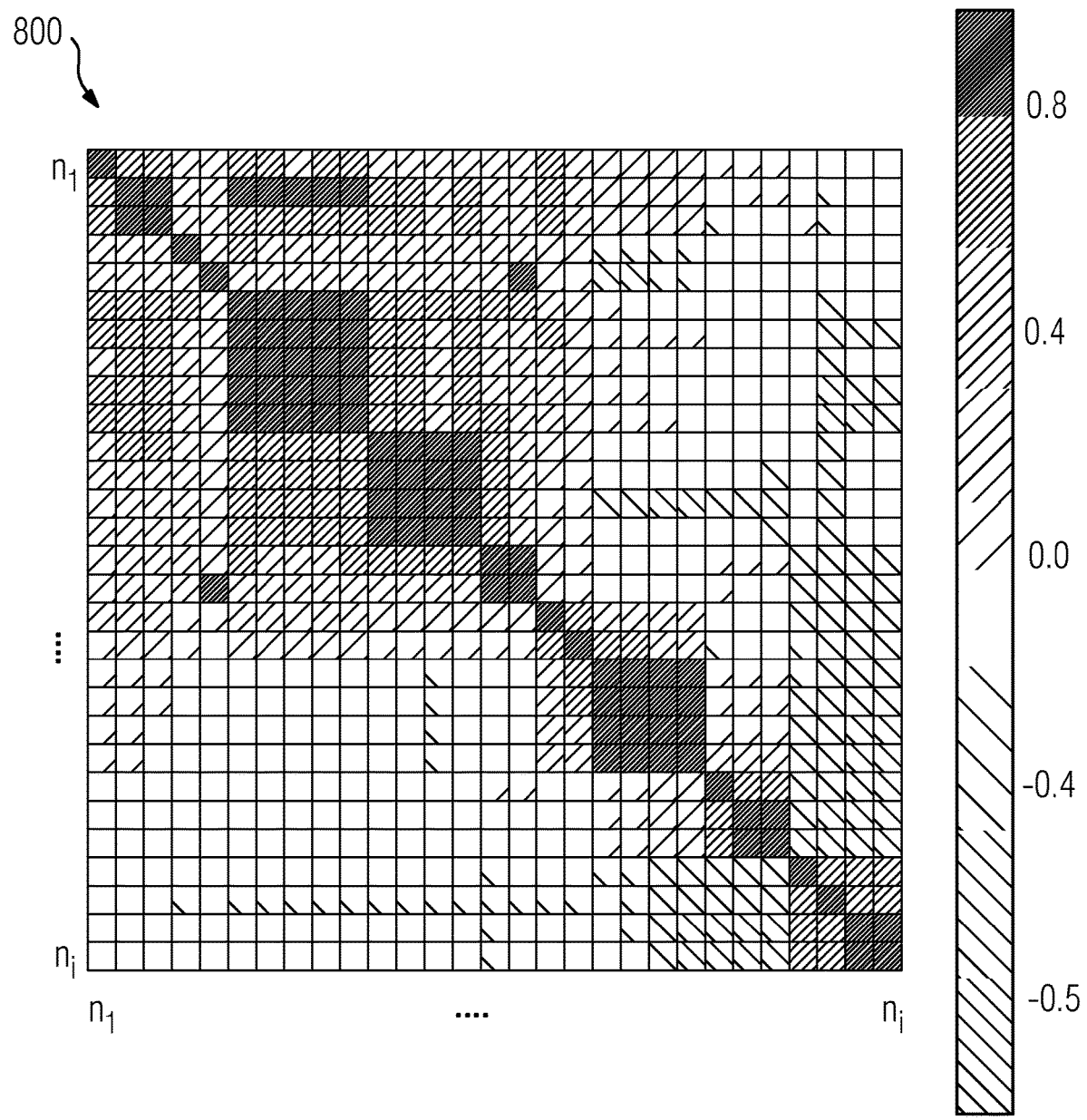
FIG. 9 shows a depiction of a level from a tensorial database structure.

FIG. 9 shows a depiction of a level 800 from a tensorial database structure, as e.g. when operating the electrical supply system 100 in FIG. 1.

Each cell in the level 800 corresponds to a coupling of two node devices of an electrical supply system that are listed on a horizontal axis and a vertical axis. A coloration in each of the cells corresponds to a correlation for a specific operating parameter recorded at the two node devices to which the respective cell relates. By way of example, a strong coloration means a good correlation for a frequency that has been recorded at the respective node devices. The correlation can be ascertained in this case from a correlation function, a difference, a quotient and/or a combination of these.

The tensorial database structure allows a graphical depiction of an operating state of the network on the basis of operating parameters of the node devices thereof. To this end, an automation network is provided with a display device, for example, which outputs such "heatmap" depictions, as shown in FIG. 9, of the operating state of the network. This facilitates operation and control and also subsequent fault analysis and the like.

When an event has occurred, the operating parameters recorded at the node devices react differently depending on a distance from the event. The reactions of the operating parameters continue via couplings of node devices and become likewise identifiable at the coupled node devices. By means of the level 800, such reactions can be illustrated in an overview. This allows the event to be located and analyzed quickly and efficiently.

Although the present invention has been described on the basis of exemplary embodiments, it is modifiable in a wide variety of ways. In particular, the network 100 and the described method can be applied to further networks having node and edge devices. In particular, the network 100 may be a manufacturing installation, a supply network or a logistical network. The node devices of a network may be field devices and/or measurement points. The term coupling relates to the function of an edge device.

The invention claimed is:

1. A method for operating a network having multiple node devices, comprising:
providing a plurality of node devices,
providing a plurality of edge devices,
coupling each node device of the plurality of node devices to at least one other node device by a respective edge device of the plurality of edge devices;
stipulating a global time for all the node devices and edge devices;
recording the node devices;
recording the edge devices;
allocating an address element to each node pair $n_p$-$n_q$ comprising two node devices that are couplable;

storing the address elements;
allocating a content element to each address element, the content element indicating the presence or absence of coupling between the node pair to which the address element is allocated;
storing the content element on the basis of the respective address element to which the content element has been allocated;
recording at least one operating parameter for at least one selected node pair or a selected node device;
storing the at least one operating parameter as a further content element on the basis of the respective address element that has been allocated to the selected node pair or the selected node device;
determining a reference value for the at least one recorded operating parameter;
computing a relative operating parameter on the basis of the at least one recorded operating parameter and the determined reference value; and
storing the relative operating parameter on the basis of the respective address element to which the at least one recorded operating parameter is allocated;
wherein the recording of the edge devices and the recording of the at least one operating parameter involve a respective global time instant being recorded as well, and the respective global time instant is also stored when the content element and/or the further content element is/are stored,
wherein the storing of the address element, of the content element and of the at least one further content element is effected in a database device having a tensorial database structure.

2. The method as claimed in claim 1, wherein
at least one portion of the node devices or edge devices provides the at least one operating parameter and the associated global time instant according to the tensorial database structure.

3. The method as claimed in claim 1, further comprising:
recording a set of different operating parameters; and
storing the different operating parameters as further content elements on the basis of the respective address element to which the further content elements are allocated.

4. The method as claimed in claim 1, wherein
the at least one operating parameter wherein a flow of traffic, a flow of current, a flow of material, a flow of energy, a power draw and/or a supply path.

5. The method as claimed in claim 1, wherein
the recording of the global time instant is effected by means of satellites, particularly a GPS system.

6. The method as claimed in claim 1, wherein
at least one portion of the node devices and/or edge device measures and/or stores the at least one operating parameter on the basis of the allocated address element.

7. The method as claimed in claim 1, further comprising:
controlling at least one portion of the node devices and/or edge devices on the basis of the stored content elements.

8. The method as claimed in claim 7, wherein
the controlling is effected by the at least one portion of the node devices and/or edge devices themselves.

9. The method as claimed in claim 1, wherein
the coupling of each node device to at least one other node device is effected on the basis of the stored content elements.

10. A network having multiple node devices that is suitable for carrying out the method as claimed in claim 1.

11. The network as claimed in claim 10, wherein the network is suitable for transporting or transmitting resources, material, current, energy and/or traffic.

12. The network as claimed in claim 11, comprising:
a database device for storing address elements and at least one operating parameter of node pairs comprising two node devices that are intercouplable by using a respective edge device; and
a computation unit for allocating the content elements to the respective address element and for retrieving the address element or the content elements.

13. The network as claimed in claim 11, further comprising:
a user interface for displaying the stored address element and the stored content elements for an operator of the network.

* * * * *